United States Patent
Konschuh et al.

(10) Patent No.: US 9,988,914 B2
(45) Date of Patent: Jun. 5, 2018

(54) ENVIRONMENTAL SEVERITY MEASUREMENT TOOL

(71) Applicant: Arrival Oil Tools, Inc., Calgary (CA)

(72) Inventors: Chris Konschuh, Calgary (CA); Mike Crowther, Carlisle (GB); Landon Steiger, Airdrie (CA); Michael Craig Shaw, Carlisle (GB)

(73) Assignee: Arrival Oil Tools, Inc., Calgary, Alberta (CA)

(*) Notice: Subject to any disclaimer, the term of this patent is extended or adjusted under 35 U.S.C. 154(b) by 894 days.

(21) Appl. No.: 14/209,965

(22) Filed: Mar. 13, 2014

(65) Prior Publication Data

US 2014/0262515 A1    Sep. 18, 2014

Related U.S. Application Data

(60) Provisional application No. 61/789,937, filed on Mar. 15, 2013.

(51) Int. Cl.

| | |
|---|---|
| *G01P 15/00* | (2006.01) |
| *F01D 5/30* | (2006.01) |
| *G01P 15/18* | (2013.01) |
| *E21B 45/00* | (2006.01) |
| *F01D 9/04* | (2006.01) |
| *E21B 44/00* | (2006.01) |

(52) U.S. Cl.
CPC ............ *F01D 5/3007* (2013.01); *E21B 44/00* (2013.01); *E21B 45/00* (2013.01); *F01D 5/3084* (2013.01); *F01D 9/04* (2013.01); *G01P 15/18* (2013.01); *F05D 2230/237* (2013.01); *Y10T 29/49337* (2015.01)

(58) Field of Classification Search
None
See application file for complete search history.

(56) References Cited

U.S. PATENT DOCUMENTS

| 5,234,057 A * | 8/1993 | Schultz ................. E21B 34/066 166/264 |
| 6,871,410 B1* | 3/2005 | Le Jeune .............. E21B 47/024 175/40 |
| 7,584,055 B2* | 9/2009 | Parfitt ................... E21B 47/026 175/44 |
| 7,604,072 B2 | 10/2009 | Pastusek et al. |

(Continued)

OTHER PUBLICATIONS

APS Technology, "Vibration Memory Sub (VMS)—Technical Data Sheet," (2009), 2 pages.

*Primary Examiner* — Lisa Caputo
*Assistant Examiner* — Nasir U Ahmed
(74) *Attorney, Agent, or Firm* — Blank Rome LLP

(57) ABSTRACT

An environmental severity measurement tool measures acceleration along 3 axes to determine shock and vibration affecting a downhole tool in which the environmental severity measurement tool is disposed. The environmental severity measurement tool includes a replaceable battery and electronics disposed within an external housing. A pin provides a way to ensure the environmental severity measurement tool is oriented in a known orientation. Data sampled by the tool can be downloaded from the tool to an external device through a connector port of the electronics. Software in the tool controls the operation of the tool and can be configured from an external device.

11 Claims, 10 Drawing Sheets

(56) References Cited

U.S. PATENT DOCUMENTS

| | | | |
|---|---|---|---|
| 8,087,477 B2 | 1/2012 | Sullivan et al. | |
| 2006/0047430 A1* | 3/2006 | Edwards | G01V 9/00 702/6 |
| 2006/0196664 A1* | 9/2006 | Hall | E21B 44/00 166/297 |
| 2009/0187391 A1* | 7/2009 | Wendt | G01V 1/28 703/7 |
| 2010/0126711 A1* | 5/2010 | Buss | E21B 47/10 166/66.7 |
| 2011/0087434 A1* | 4/2011 | Lie | E21B 47/0002 702/8 |
| 2011/0147083 A1* | 6/2011 | Mauldin | E21B 44/00 175/50 |
| 2012/0247832 A1* | 10/2012 | Cramer | E21B 47/011 175/40 |
| 2012/0290209 A1 | 11/2012 | Mauldin et al. | |

* cited by examiner

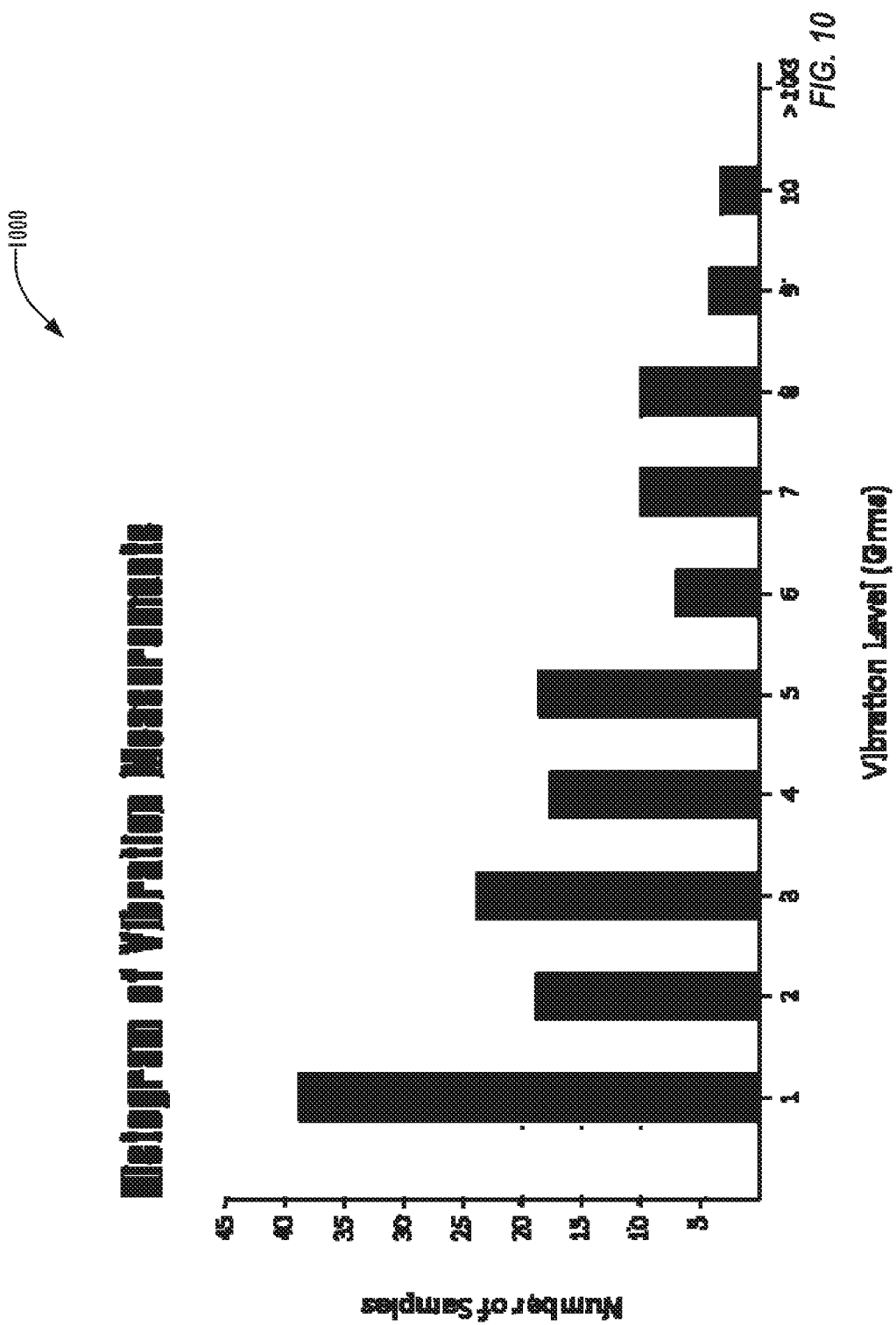

ENVIRONMENTAL SEVERITY MEASUREMENT TOOL

TECHNICAL FIELD

This disclosure relates generally to the field of downhole logging tools. More particularly, but not by way of limitation, it relates to a tool for monitoring shock and vibration in downhole tools, and methods for using such a tool.

BACKGROUND ART

Shock and vibration is increasingly acknowledged to be the source of unnecessary expense when drilling a well. Many companies are using exciters when drilling to extend horizontal drilling runs longer than can be done without exciters. However, the shock and vibrations produced by the exciters when in operation downhole can damage electronics in the drill string. Some companies have built shock and vibration monitors into downhole tools or have provided complete downhole subs that monitor environmental conditions downhole. But these tools are limited in usefulness, because they lack the flexibility that drilling and logging operators would like to provide environmental severity measurements at arbitrary places in a drill string without having to add an entire sub into the drill string.

In addition, some providers of downhole equipment provide their equipment on a rental basis, with charging based on hours of downhole operation of the tool. Such providers have typically had to depend upon accurate records being kept by the drilling operator of that usage, with little or no way to confirm the accuracy of the information provided by the drilling operator.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIGS. 9 and 10 are graphs illustrating examples display of data obtained from an environmental severity measurement tool according to one embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

An environmental severity measurement (ESM) tool can provide better information to drilling and logging operators about the level of shock and vibration encountered by downhole tools. Instead of building the tool as a complete drill sub or building the functionality into a tool designed for other downhole activity, a small modular tool that can be inserted into a downhole tool can allow drilling operators to easily add ESM functionality to downhole tools where needed on the fly, and remove the ESM tool for analysis at a later date. In addition, such a tool may allow a technique for monitoring usage of a rented tool by drilling operators, allowing tool rental providers a way to confirm the downhole tool usage data provided by the drilling operators. An ESM tool such as is disclosed herein can be manufactured small enough to be hidden inside a downhole tool, to allow unobtrusive monitoring of usage of the tool, and detection of cheating by a drilling operator when reporting the amount of downhole operational time of the downhole tool.

Figure 1:
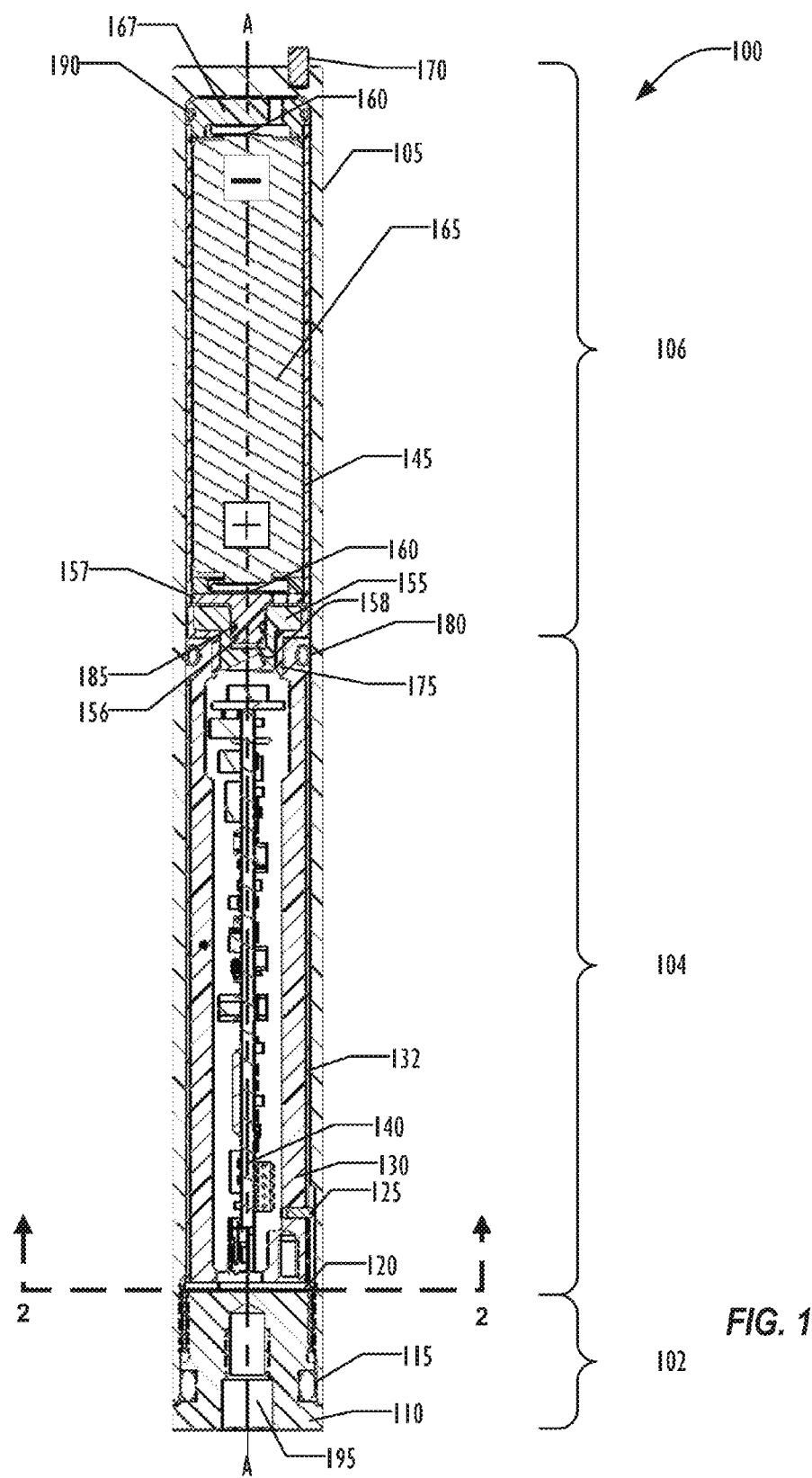
FIG. 1 is a sectional view illustrating an environmental severity measurement tool according to one embodiment.

FIG. 1 is a sectional view of an ESM tool 100 according to one embodiment. The tool is generally made up of 3 portions, an endcap portion 102, an electronics portion 104, and a battery portion 106, all disposed with an external housing 105. In one embodiment, the entire ESM tool is approximately 7 inches long and ¾ inches in diameter.

The endcap portion 102 includes an endcap 110 that may be threadedly engaged with the external housing 105. Other techniques for closing the external housing 105 with the endcap 110 may be used as desired. In some embodiments, an O-ring 115 may be disposed about the endcap 110, to seal the endcap 110 with the external housing 105. A fitting 195 may be formed partially through the endcap 110 for using a tool to tighten the endcap 110 onto the external housing 105.

Figure 2:
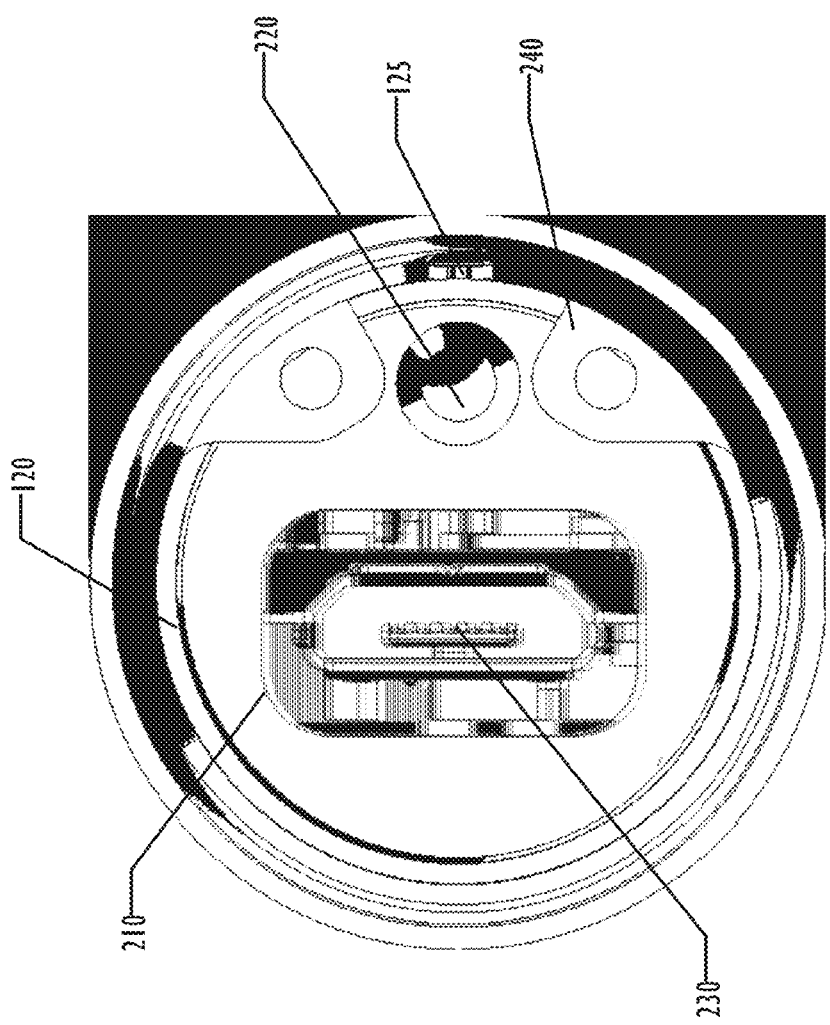
FIG. 2 is an end view illustrating an electronics portion of an environmental severity measurement tool according to one embodiment.

The electronics portion 104 in one embodiment is formed of an internal housing 130 that is configured for insertion through an end of the external housing 105 between the battery portion 106 and the endcap portion 102. Electronics for the electronics portion 104 are mounted inside the internal housing 130 on a circuit board 140. In some embodiments, the circuit board 140 is a dual-sided circuit board, with circuitry components mounted on both sides of the dual-sided circuit board 140 in any desired layout. The internal housing is preferably formed of metal. An endcap 120 for the internal housing 130 allows insertion and mounting of the circuit board 140 in the internal housing 130, while allowing access to the circuit board 140 through an opening 210 as illustrated in FIG. 2. The external housing 105 and the internal housing 130 are isolated throughout most of the length of the internal housing 130 by a isolating sleeve 132, which may be formed of an insulating material such as a PEEK thermoplastic.

A connector port 230 is disposed at an end of the circuit board 140, allowing connecting an external device to the circuitry mounted on the circuit board 140 when the endcap 110 is removed from the ESM tool 100. As illustrated in FIG. 2, the connector port 230 may be a micro USB connector port. The connector port 230 is positioned so that connection may be made through the endcap 120 even when the endcap 120 is in place and the electronics portion 104 disposed in the external housing 105. In one embodiment, the end cap 120 and the internal housing 130 are one machined part. A female screw thread 220 can be machined into the endcap 120 and can be used to aid in the removal of the electronics portion 104 from the external housing 105. In some embodiments, a circlip 240 may be used to hold the endcap 120 and electronics in place along longitudinal axis A-A. A canted coil spring 180 ensures grounding of the internal housing 130 to the external housing 105. In some embodiments, a pin 125 is pressed into the internal housing 130 and is used to prevent rotation of the internal housing 130 relative to the external housing 105.

Returning to FIG. 1, the battery portion 106 is designed for a replaceable battery 165, although non-replaceable batteries can be used. A non-replaceable battery is one that cannot be replaced without disconnecting, such as unsoldering or cutting, permanent connections between the battery and the device being powered by the battery, and is typically connected by wires soldered to solder tabs on the battery that are soldered or otherwise connected to the device being powered. A replaceable battery is one that can be removed and replaced without disconnecting such a permanent connection. Although a single battery 165 is illustrated in FIG. 1, any number of batteries can be used as desired, connected either in serial or in parallel.

Figure 3:
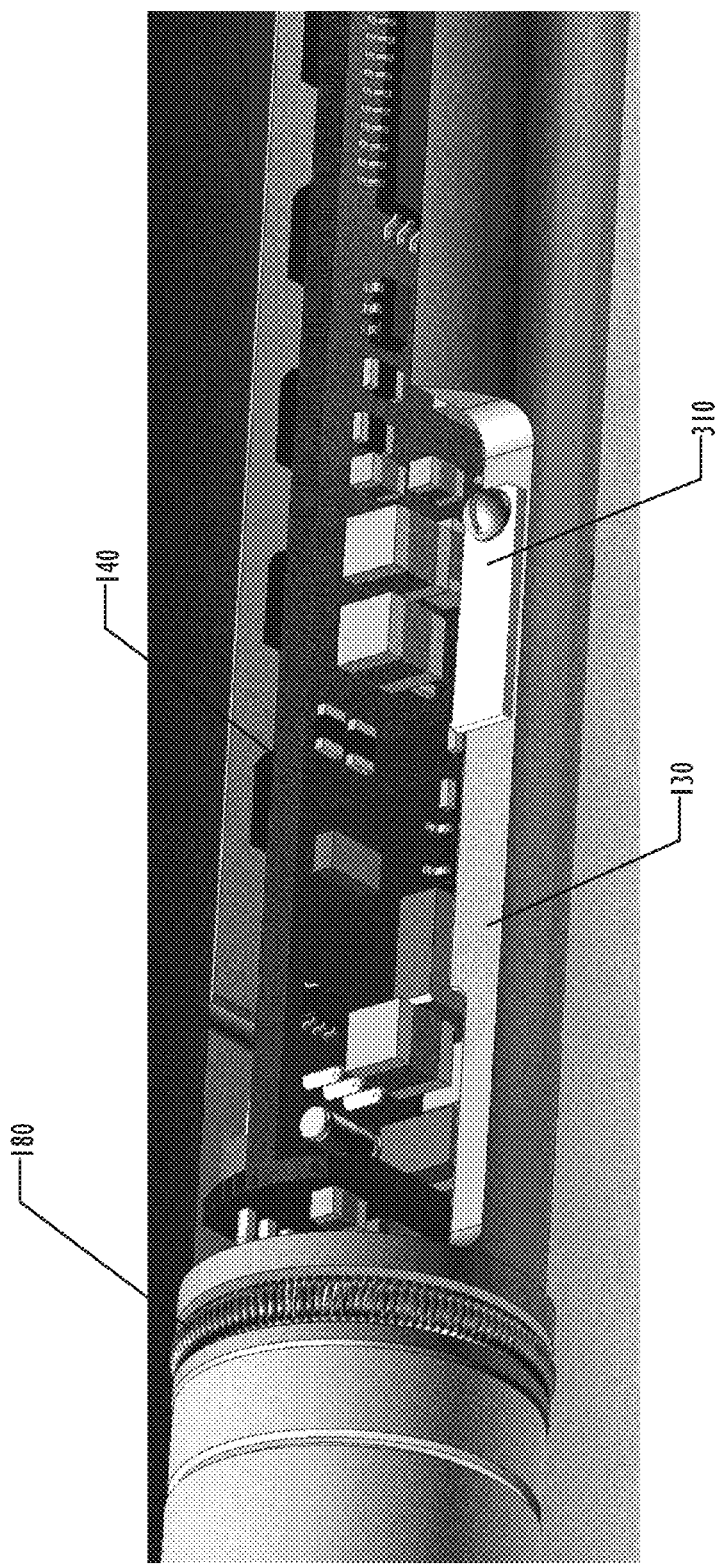
FIG. 3 is a cutaway view of a portion of an electronics module and a solder tab of an environmental severity measurement tool according to one embodiment.

The connections between the battery 165 and the circuit board 140 are designed to resist electrical disconnection under the significant shock and vibration that the ESM tool 100 encounters in operation in a drill string. In one embodiment, the battery 165 is disposed within a battery housing 145 that is configured for disposal within the external housing 105. Battery housing 145 is made of an insulating material, such as a PEEK thermoplastic. Electrical contacts 160 are disposed for contact with the negative and positive contacts of the battery 165. The electrical contacts 160 may be springs or other types of contacts that present positive pressure against terminals of the battery 165. The negative electrical contact 160 may be formed as part of an endcap 167 that is grounded to the external housing 105 in any desired way, such as by a canted spring 190. Other techniques for providing electrical conductivity between the negative terminal of the battery 165 and the external housing 105 may be used as desired. Although as illustrated in FIG. 1, replacement of the battery 165 requires removal of the electronics portion 104, in other embodiments an endcap (not shown) may be placed on the battery portion end of the external housing 105 allowing access to the battery 165 without having to remove the electronics portion 104. In one embodiment, the negative contact between the battery 165 and the circuit board 140 is formed by an electrical pathway connection from the negative terminal of the battery 165 through the endcap 167, canted spring 190, external housing 105, canted spring 180, internal housing 130, solder tab 310 (as illustrated in FIG. 3), and finally through a wire (not shown) into the circuit board 140. Other techniques for connecting the negative battery terminal to the circuit board 140 may be used.

In one embodiment, the battery 165 is approximately the size of a AA battery. Any desired replaceable battery type may be used, such as a lithium ion battery.

The positive end of the battery 165 is electrically connected to the circuitry mounted on the circuit board 140 allowing for relative movement of the battery 165 and the circuit board 140 while remaining electrically connected. Such a connection prevents movement caused by shock and vibration from causing a loss of electrical connectivity between those two elements, even temporarily, ensuring power is provided to the circuit board 140 to allow measurement of environmental conditions when desired. In one embodiment, a positive cap 157 electrically connects the positive terminal through the positive contact 160 to a positive connector 155. A projection 156 of the positive cap 157 extends through a well 158 of a positive connector 155 to make contact with the positive connector 155. An insulating spacer 175 electrically separates the positive connector 155 from the external housing 105 and the electronics portion internal housing 130. The spacer 175 is typically made of a PEEK thermoplastic. A canted spring 185 may be used to further insure electrical connection between the positive cap 157 and the positive connector 155 under the environmental conditions in which the ESM tool 100 is expected to operate. The positive connector 155 is electrically connected to the circuit board 140. Other techniques for ensuring that relative movement of the positive cap 157 and the positive connector 155 caused by shock and vibration does not interrupt the electrical connection between the battery and the circuit board 140 may be used. In one embodiment, the positive connector 155 is connected to the circuit board 140 by a wire (not shown) one end of which is inserted into the positive connector 155 and the other end of which is connected to the circuit board 140. Other techniques for connecting the positive connector 155 to the internal housing 130 may be used.

At an opposite end from the endcap 110, a mounting pin 170 extends longitudinally outward from the end of the external housing 105 for connecting with a mounting hole in the downhole tool in which the ESM tool 100 is disposed, to ensure a known orientation of the ESM tool 100 relative to the downhole tool. The pin 170 can be omitted, although the lack of a known orientation of the ESM tool 100 relative to the downhole tool will limit the amount of information that can be determined by analyzing the tool data. Typically, the ESM tool 100 is disposed within a pressure-protected pocket in the downhole tool, to avoid borehole high pressure conditions from damaging the components of the ESM tool 100. In another embodiment, the external housing 100 and endcap 110 can be designed and built to withstand borehole high pressure conditions.

Figure 4:
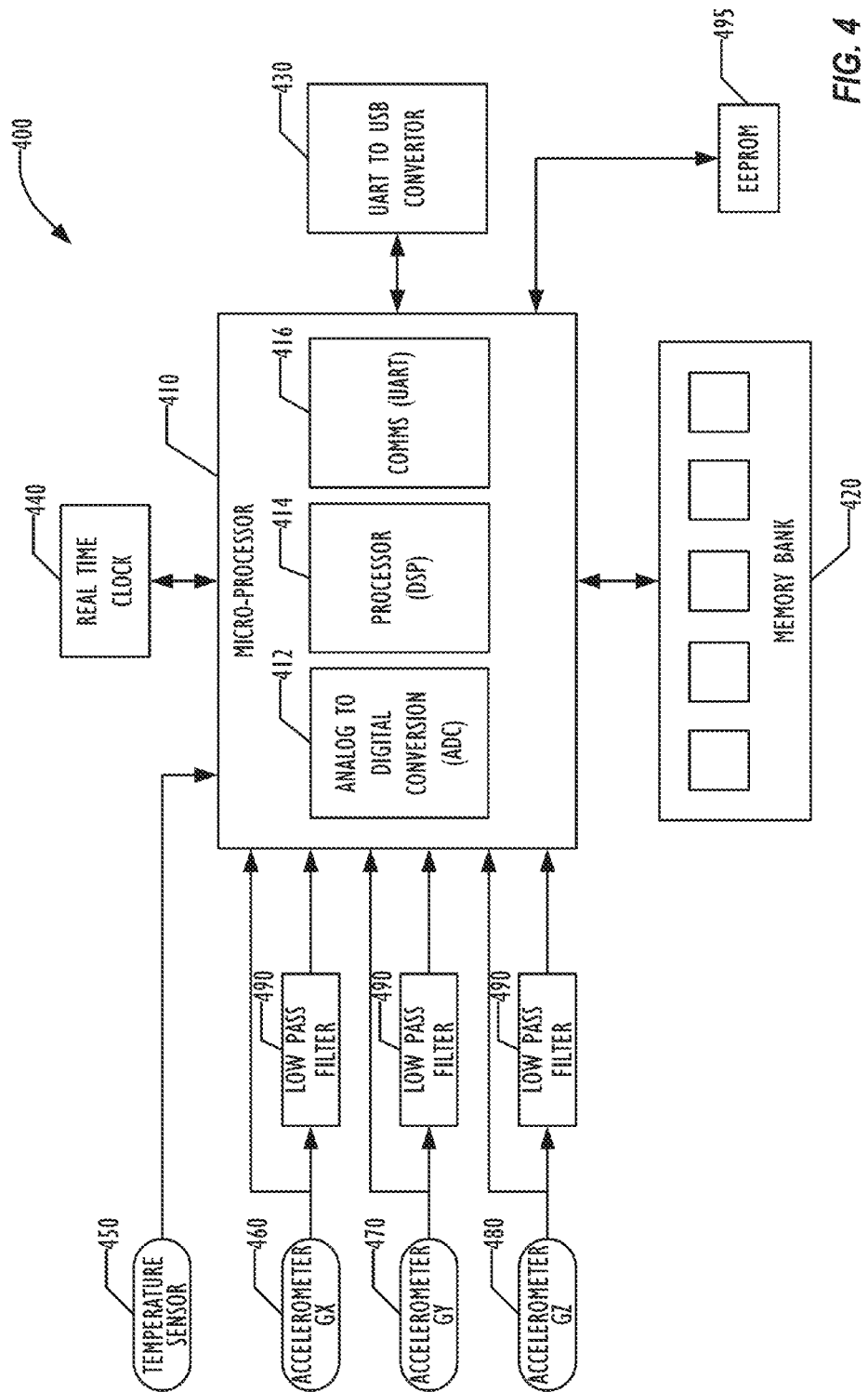
FIG. 4 is a block diagram illustrating an electronics portion of an environmental severity measurement tool according to one embodiment.

FIG. 4 is a block diagram illustrating circuitry components that may be mounted on the circuit board 140 as a processing circuitry 400. The arrangement of the components in FIG. 4 is illustrative and need not correspond to the physical layout of the circuitry on the circuit board 140. A microprocessor 410 provides processing capability for the ESM tool 100. The microprocessor 410 may include an analog to digital conversion circuit 412, a processor circuit 414, and a communications circuit 416. The processor circuit 414 may be a digital signal processor (DSP) of any convenient type. The communication circuit 416 may perform the functions of a universal asynchronous receiver/transmitter (UART). In one embodiment, a UART to USB converter 430 provides connection between the UART 416 of the microprocessor 410 and a USB connector port such as the USB connector port 230 illustrated in FIG. 2. If a different connector type is used than a USB connector, the UART to USB converter 430 may be replaced with a converter to the appropriate type of connector. A bank of EEPROM devices 495 provide non-volatile data storage and may also be used for storing software for controlling the ESM tool 100. In addition, environmental severity measurement data may be stored in the memory bank 420 and/or the EEPROM 495 for downloading to an external device for further analysis. A real time clock (RTC) 440 may be provided for providing time data to the microprocessor 410. The RTC 440 may be synchronized with a clock on an external device for setting the RTC 440. Data for the processing circuitry 400 may be provided by a collection of sensors. As illustrated in FIG. 4, a temperature sensor 450 and three accelerometers 460, 470, and 480 provide acceleration data to the microprocessor 410 in the X, Y, and Z directions, respectively. Low pass filters 490 may be used to filter out high frequency noise in any desired frequency bands. Other components may be included in the processing circuitry 400 as desired to collect other types of environmental data that may be of interest. For example, pressure sensors may be included in the processing circuitry 400 for monitoring pressure on the ESM tool 100. In another example, the data generated by the accelerometers 460, 470, and 480 can be used to measure RPM and stick-slip, either calculating the RPM and stick-slip measurements in the ESM tool 100 or calculating the RPM and stick-slip measurements from acceleration data downloaded to the external device.

The elements illustrated in FIG. 4 are illustrative and by way of example only. Other elements may be included in the circuitry mounted on the circuit board 140 as desired. In addition, components illustrated as single elements in FIG. 4 may be provided as multiple elements, and components illustrated as multiple elements in FIG. 4 may be provided as a single element combining the functionality of the elements illustrated in FIG. 4.

The ESM tool 100 can be placed at any desired location in a drill string, including in an inner diameter of a pin connector of a drill bit, in an inner diameter of a box-pin connector.

The ESM tool 100 described above is capable of storing vibration and shock data in all 3 axes and temperature data in a downhole environment. This logged data can be used to determine the severity of the drilling conditions in the downhole environment. In addition data is also recorded that can be used to determine the environment that the logger has been in over an extended surveying period. In one embodiment, the extended survey period may be as long as 120 days, and can start when the ESM tool 100 is set up in a shop, continuing as the tool is transported to the field and used downhole, and even afterwards.

In one embodiment, the ESM tool 100 has two modes of operation which operate concurrently: Surveying Mode and State Survey Mode. Other embodiments may provide only one mode of operation, or provide for only one mode to be active at any time.

In surveying mode the ESM tool 100 can be configured to take sample sets at a given samples per second rate and for a given sample duration. Acceleration in 3 axes (Gx, Gy and Gz) is sampled as well as temperature. For example, the acceleration in 3 axes may be sampled at 10 samples per second for 3 seconds giving a total of 90 samples of accelerometer data plus temperature data. These samples (raw data) can be used to calculate maximum acceleration (Gmax), an average acceleration (Grms), or a Fast Fourier Transform for each axis. The raw data or the calculated values can then be stored in the on board memory 420 with each survey being recorded with a real time timestamp based on the real time clock 440. The stored data can be retrieved when the tool is connected to an external device, such as a personal computer and the data dumped via the USB connector port 230. The uploaded data can be used to determine the severity of the environment experienced by the downhole tool during the drilling operation.

In state survey mode the tool samples the sensors, calculates a total acceleration (Gtotal) and an X-Y acceleration (Gxy), and stores the results in the on board memory with a real time timestamp based on the real-time clock 440. This state survey data can be uploaded at a later time as with the surveys taken in the surveying mode. This state survey data can be used to identify the operating environment experienced by the tool during its survey lifecycle. The data can be used to identify different states of the ESM tool 100, such as when the tool was static at the shop, installed in the downhole drilling assembly, lifted onto a truck or similar vehicle, transported to rig, laid down, lifted into slips, during drilling operation, pulled out of hole, laid down, and returned to the shop. In one embodiment, a dedicated block of memory 420 may be assigned to the state survey mode data, so that the ESM tool 100 can continue to take and store readings at configured intervals regardless of whether the surveying mode is active. The ESM tool can be configured to sample in state survey mode at any given interval, such as every 10 minutes.

Figure 5:
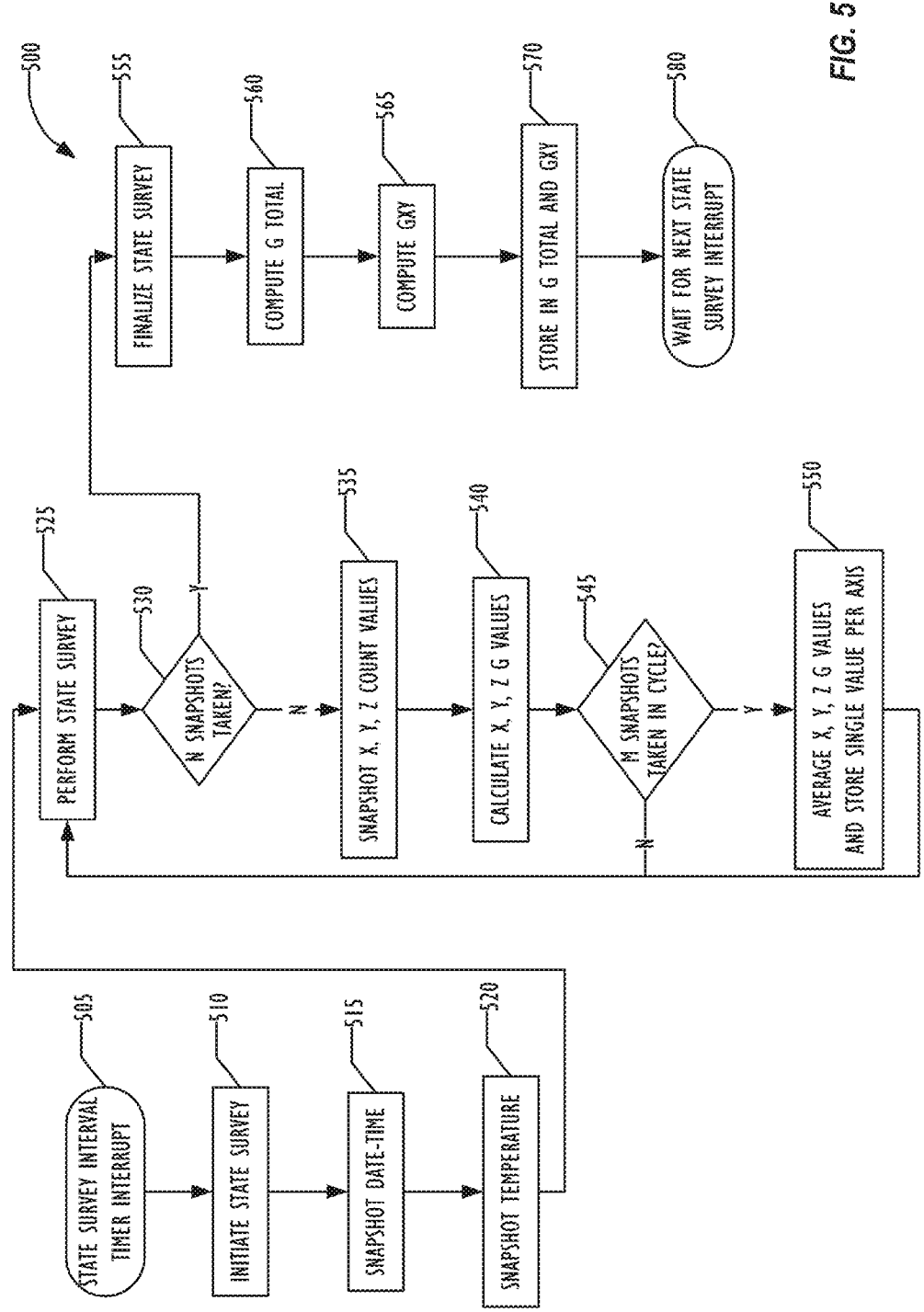
FIG. 5 is a flowchart illustrating a technique for obtaining environmental severity measurement data in an environmental severity measurement tool according to one embodiment.

FIG. 5 is a flowchart illustrating a technique performed by onboard software of the ESM tool 100 in state survey mode according to one embodiment. The technique begins in block 505 when an interval timer pops generating an interrupt at the configured time interval. In block 510 a state survey cycle begins. In block 515 a snapshot of the date and time is obtained from the real-time clock 440. In block 520 a snapshot of the temperature is obtained from temperature sensor 450. In block 530, if a predetermined number of snapshots have been taken, then the state survey may be finalized in block 555, the total acceleration Gtotal is computed in block 560, the X Y acceleration Gxy is computed in block 565, and the state survey data is stored in memory 420. The ESM tool 100 may then wait in block 580 for the next state survey interrupt.

If less than the predetermined number of snapshots has been taken, then in block 535, a snapshot is taken in the X, Y, and Z directions from the accelerometers 460, 470, and 480. The acceleration values in the X, Y, and Z direction may then be computed in block 540. In one embodiment, in block 545 if a predetermined number of snapshots in a cycle has been taken, an average G values may be computed in block 550 in each direction, storing a single value for each axis in the memory 420 before repeating the state survey in block 525.

Once the predetermined number of snapshots has been taken, then in block 555 the state survey may be finalized. In block 560 a total acceleration Gtotal may be computed. In block 565, and X-Y acceleration Gxy may be computed. In some embodiments, data computed during the sampling period is stored in memory 420 in the area dedicated for state survey data, then at the completion of the activity, copied into an EEPROM for non-volatile storage of the data in block 570, before waiting for the next state survey interrupt in block 580.

Figure 6:
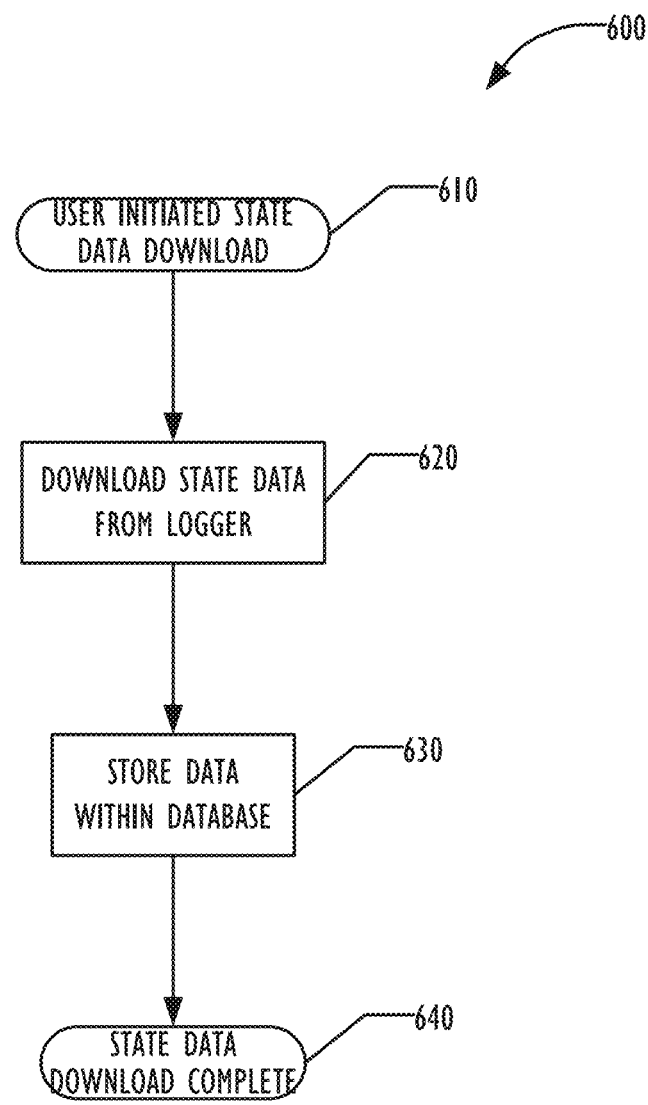
FIG. 6 is a flowchart illustrating a technique for uploading data from an environmental severity measurement tool according to one embodiment.

FIG. 6 is a flowchart illustrating a technique 600 for uploading data saved in memory bank 420 to an external device for further analysis or for reporting. In block 610, state data uploading commences at any desired time. In block 620, the state data may be uploaded from the ESM tool 100 through the USB connector port 230 to an external device (not shown). In block 630, the uploaded data may be stored as desired, for example in a database of survey data from the ESM tool 100. The state data upload completes in block 640. The data uploaded during this process may be either or both of the surveying mode data or the state survey mode data as desired. Once uploaded, further analysis or reporting may be done on the environmental severity measurement data obtained from the ESM tool 100, using any desired analysis and/or reporting tools available.

Although not illustrated in FIG. 6, data may be uploaded to the ESM tool 100 in some embodiments, allowing external configuration of the ESM tool 100 and/or uploading of data for processing by the processor 410. In one embodiment, the uploaded configuration data may include a sample rate in samples per second (Fs), a sample window duration (SD), a sample window interval (SI), a survey vibration threshold (SVT), an activation threshold (ActTh), a number of activation samples to be taken (ActS), an activation sample interval (ActSI), a deactivation threshold (De-ActTh), a deactivation time (DeActD), and a storage mode (SM) indicating what types of acceleration values should be stored by the ESM tool 100. This list of configuration data is illustrative and by way of example only, and other types of configuration data may be uploaded to the ESM tool 100 through the connector port 230.

Figure 7:
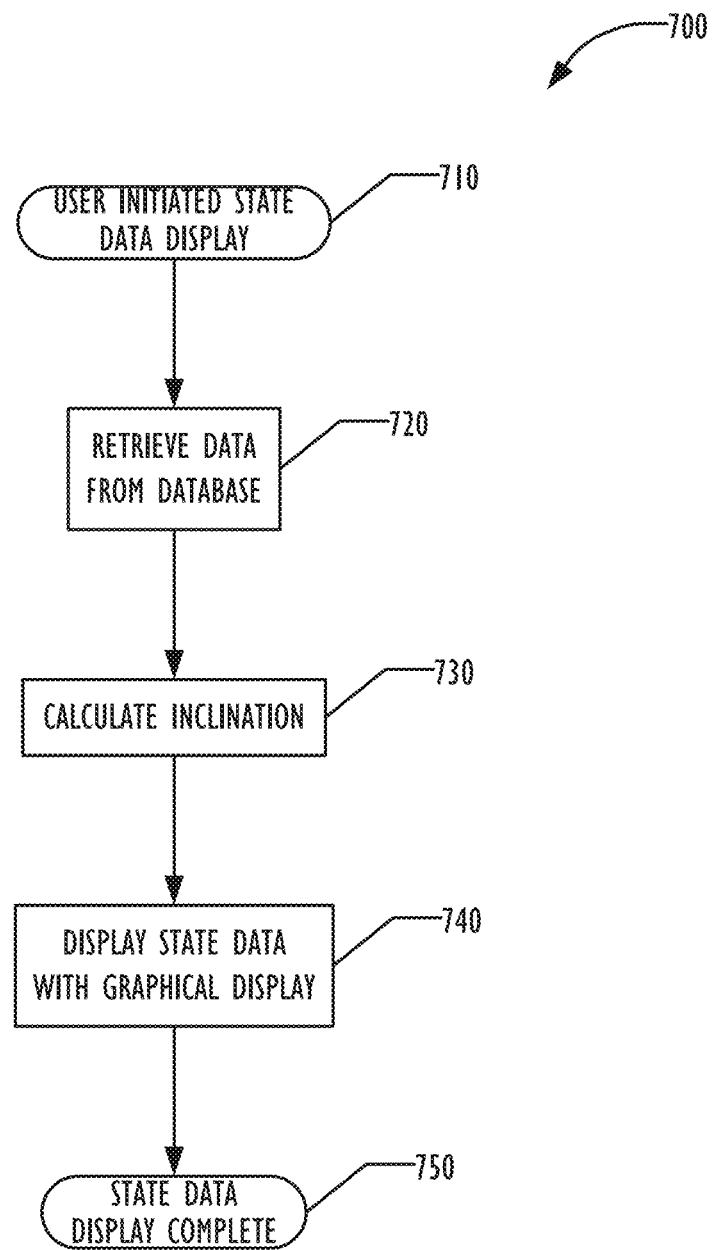
FIG. 7 is a flowchart illustrating a technique for displaying data from an environmental severity measurement tool according to an embodiment.

FIG. 7 is a flowchart illustrating a technique 700 for displaying data obtained from the ESM tool 100. In block 710 a user initiated display of the extracted state data may be performed. In some embodiments, instead of uploading the data from the ESM tool 100 to an external device, the software loaded into the ESM tool 100 may provide for connecting an external display device (not shown) to the ESM tool 100 using the USB port 230 directly display stored data on the external display. In other embodiments, the data from the ESM tool 100 has previously been uploaded to the external device and stored in any convenient database format. Then in block 720 the data to be retrieved from the database, using any or all of the stored data as desired. In block 730 an inclination of the ESM tool 100 at the time of the data collection may be calculated from the data retrieved from the database. In some embodiments, the extracted state data may be displayed with a graphical device in block 740. Other types of display devices may be used. Finally, the state data display completes in block 750.

In one embodiment, when the ESM tool 100 is first powered up from the battery 165 the ESM tool 100 goes into a Sleep/Suspend mode to minimise the amount of current drawn from the battery 165. When the ESM tool 100 is in the Sleep/Suspend mode, the only way that the ESM tool 100 wakes-up from this mode is to receive a Go-Live command from the external device via the connector port 230.

During normal operation the ESM tool 100 may implement a variety of power saving schemes. Although the ESM tool 100 generally continually takes surveys, in order to minimize current drawn, the ESM tool 100 can be put into the Sleep/Suspend mode to suspend surveying activity. In one embodiment, the ESM tool 100 can be put into Sleep/Suspend mode upon receipt of a Sleep command from the external device via the connector port 230. If the ESM tool 100 fills the memory bank 420, the ESM tool 100 may automatically transition to Sleep/Suspend mode.

Figure 8:
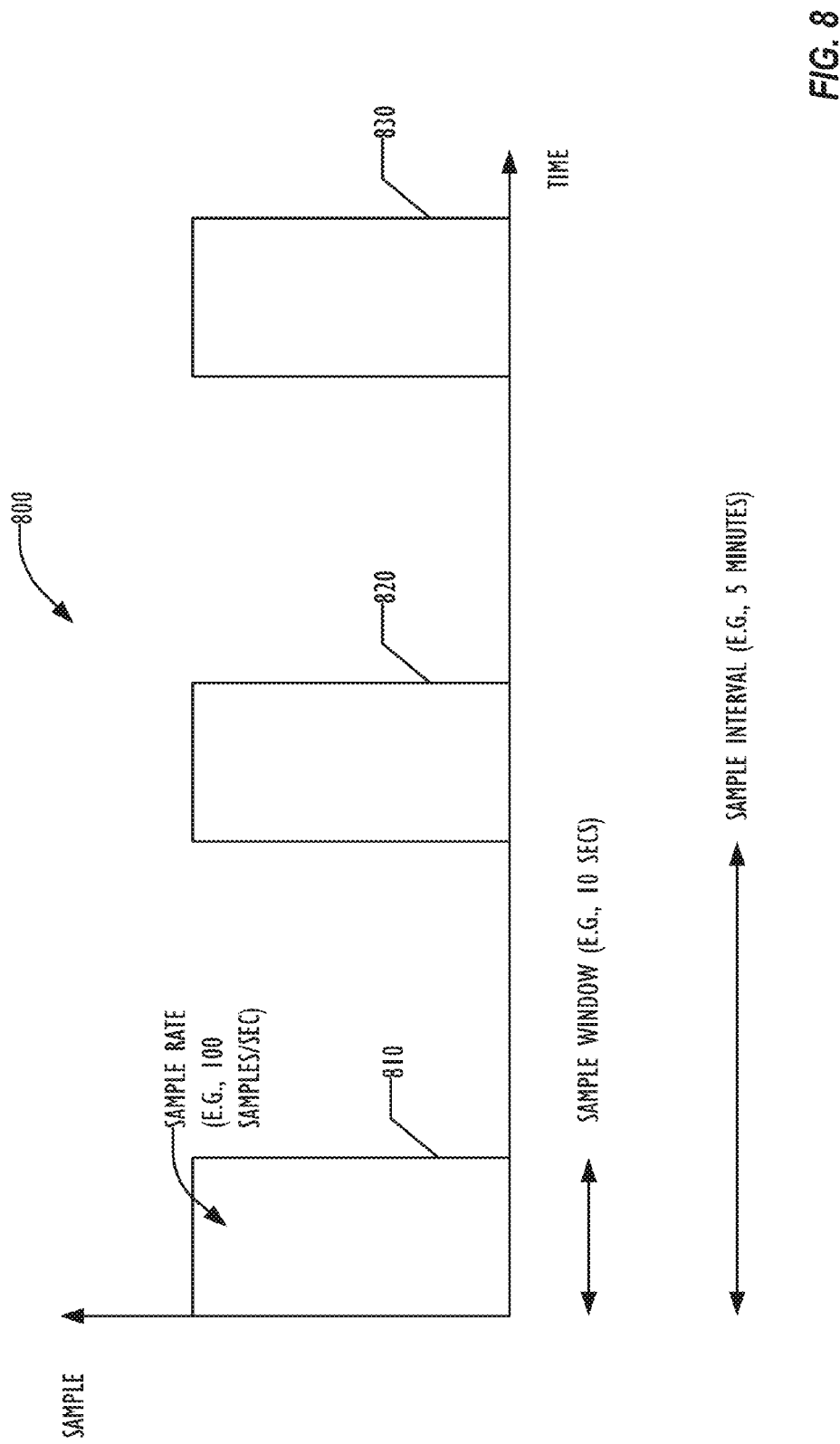
FIG. 8 is a graph illustrating an oversampling technique according to one embodiment.

FIG. 8 is a graph 800 illustrating taking samples during three sample windows 810, 820, and 830. The width of each sample window is a predetermined time. Each window opens at a predetermined sample interval, and takes samples at a predetermined sample rate. In one embodiment, during each sample window each of the 3 axes may be sampled at the requested sample rate times an Oversampling Ratio (OSR). The sensors are oversampled in order to reduce the complexity of the electronics, while retaining the required resolution from the sensors 450, 460, 470, and 480. Thus, if the OSR is set to 16, a set of 16 samples is taken at the oversampling sample rate and then averaged. This average value becomes the new sample, storing a single value for each axis. Sampled data may be recorded in memory 420 until a row of data is available to put into EEPROM 495.

In some embodiments, the data recorded during a sample window (a survey) is subjected to a 32 bin Fast Fourier Transform process. The ESM tool 100 records the FFT results in memory 420 providing the average Gtotal level is above a pre-configured survey vibration threshold (SVT). Each FFT survey will be date stamped.

In one embodiment, the ESM tool 100 powers up in a de-activated state. Prior to activation, the tool may sample Gtotal at the oversampling rate OSR to produce 1 averaged sample. This process may be repeated every ActSI seconds. The ESM tool 100 must measure a Gtotal reading in excess of a G level of ActTh for ActS successive averaged samples before the ESM tool 100 becomes activated. Once activated, the ESM tool 100 embarks on the sampling regime shown in FIG. 8, remaining active until such time de-activated.

If the ESM tool 100 sees an average Gtotal reading less than the Deactivation Threshold (DeActTh) during a sample block then the ESM tool 100 initiates a Deactivation process. Samples are then taken once per minute at the oversampling rate to generate a single sample every minute. If the tool continues to see Gtotal<DeActTh for a total of DeActD (Deactivation Duration) then the ESM tool 100 goes to its default low power state and waits for the activation signal again. This allows the tool to be active during periods of significant shock and vibration, but inactive when the environment is quiescent, preserving battery and allowing a longer operational time. The ESM tool 100 records the activation and deactivation times.

In some embodiments, the ESM tool 100 may be configured to operate in one of several storage modes that control how much data is stored in each survey. In a Grms/Gpeak storage mode, an average ms) value and a peak value are stored for each axis. In a Graw storage mode, the ESM tool 100 stores FsxSD samples for each axis. In a Gfft storage mode, the ESM tool 100 stores an FFT from the raw sampled data and stores the FFT in a predetermined number of bins of data, such as 32 bins, each bin of which can be downloaded to the external device.

Figure 9:
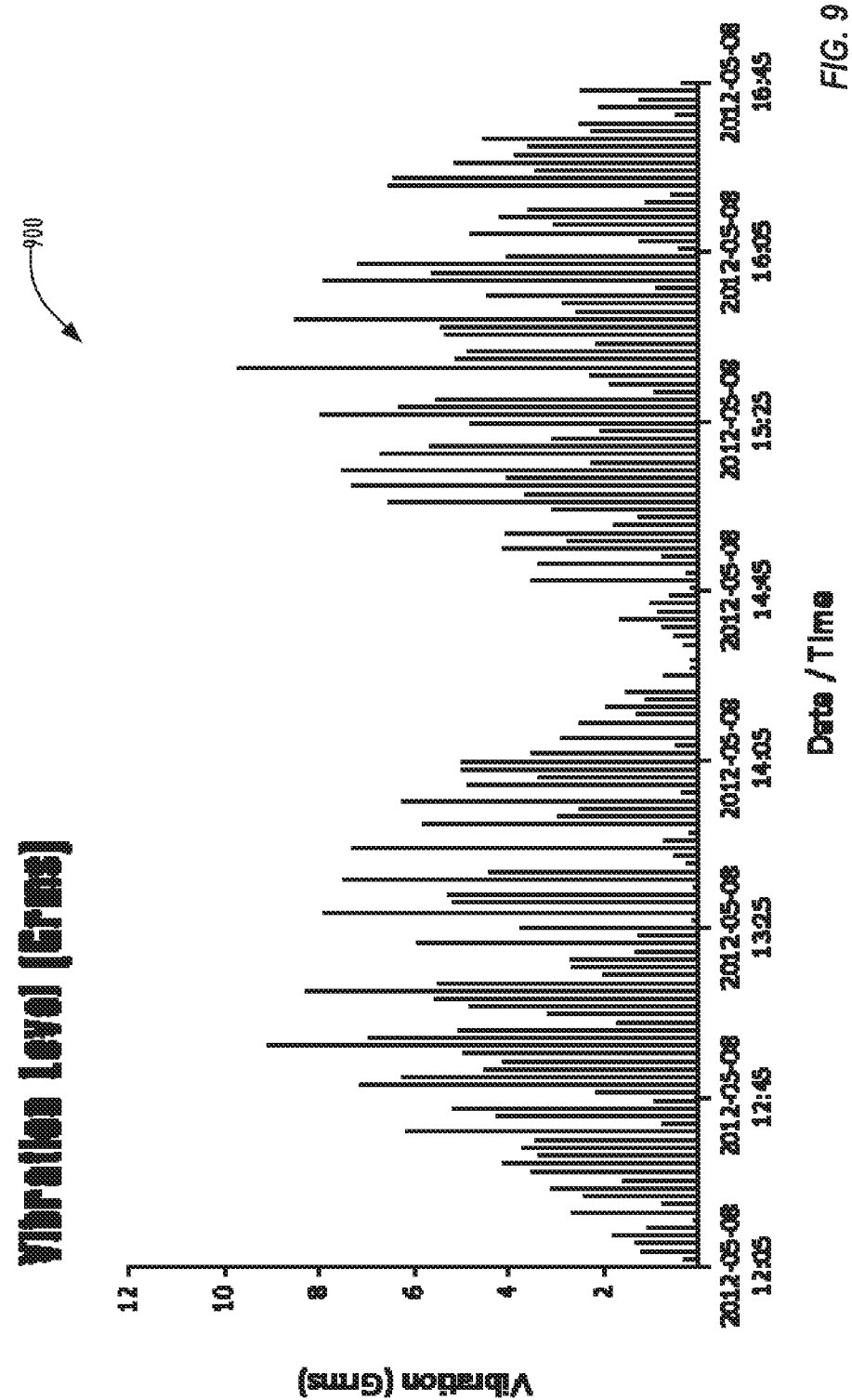

Software may be used to analyze the survey data downloaded from the ESM tool 100 to the external device. For example, FIG. 9 is a simple bar graph 900 illustrating vibration level (Grms) over time. FIG. 10 is a histogram 1000 illustrating how many samples were taken at each of a range of vibration levels. These graphs are illustrative and by way of example only, and other ways of displaying the data downloaded from the ESM tool 100 may be provided.

A tool rental operator may want to confirm the tool usage data provided by drilling operators who have rented a downhole tool from the tool rental operator, because the tool rental fee is typically charged according to the amount of usage of the rented tool. By inserting the ESM tool 100 into a downhole tool that is rented to the drilling operator, and collecting timestamped shock and vibration data, then analyzing the data after the tool is returned by the drilling operator, the tool rental operator can confirm whether the drilling operator's tool usage data is accurate. The tool rental operator inserts the ESM tool 100 into the downhole tool and activates it prior to delivery of the tool to the drilling operator. The ESM tool 100 then periodically samples usage information, storing the data as described above. Upon return of the tool from the drilling operator, the tool rental operator can extract the ESM tool 100 from the downhole tool, open the endcap 110, and connect to the electronics portion 104 with the connector port 230 to download the stored data. The tool rental operator can then analyze the downloaded data to determine the levels of shock and vibration that occurred over time to check the downhole tool usage data provided by the drilling operator. If the drilling operator's usage data is incorrect, the tool rental operator may use the data provided by the ESM tool 100 to correct the usage data and charge the correct rental fee.

By providing a small ESM tool such as described above, drilling operators and drilling tool providers can monitor usage of their downhole tools and measure shock and vibration impacts on their tools that can potentially damage those tools. The ESM tool can be placed almost anywhere in a drill string, including at the bit and multiple ESM tools can be placed in different places in the drill string, allowing a drilling operator to obtain measurements from any desired location, without extensive customization of the downhole tools in use. Configurable operating characteristics and modes allow drilling operators to obtain desired measurements that can be tailored to their specific operation. The ESM tool can be used to gain a better understanding of drilling efficiencies through shock and vibration data collection and analysis, and allows the drilling operator to correlate shock and vibration characteristics to drilling parameters such as drilling performance or downhole failure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An environmental severity measurement tool, comprising:
    an external housing, configured for disposal in a downhole tool, open at one end;
    a replaceable battery, disposed in the external housing;
    an electronics portion disposed within the external housing, comprising:
        a processor, electrically connected to the battery;
        a connector port configured to allow connection to an external device, coupled to the processor;
        three accelerometers configured to measure acceleration along three axes, coupled to the processor; and
        a non-transitory memory, coupled to the processor on which is stored software for causing the processor to:
            periodically calculate total acceleration of the environmental severity measurement tool while in a default low power state;
            fully activate the environmental severity measurement tool responsive to a comparison of the total acceleration to an activation criteria;
            calculate total acceleration and acceleration along two of the three axes from sampled measurements from the three accelerometers while fully activated;
            store calculated acceleration data; and
            download the stored acceleration data to the external device via the connector port; and return the environmental severity measurement tool to the default low power state responsive to a comparison of a deactivation criteria with the calculated total acceleration.

2. The environmental severity measurement tool of claim 1, further comprising:
    a battery housing removably disposed in the external housing, wherein the battery is disposed within the battery housing;
    a first battery contact, configured for electrical connection with a first terminal of the battery; and
    a second battery contact mechanism, comprising:
        a first portion, configured for contact with a second terminal of the battery; and
        a second portion, movable relative to the first portion, wherein the second portion remains in electrical contact with the first portion regardless of the relative movement of the first portion and the second portion, the second portion electrically connected to the electronics portion of the environmental severity measurement tool.

3. The environmental severity measurement tool of claim 2, further comprising:
    a battery housing end cap, electrically connected to the first battery contact and the external housing.

4. The environmental severity measurement tool of claim 3 wherein the electronics portion further comprises:
    an electronics portion housing, in which the processor, connector port, accelerometers, and non-transitory memory are disposed, the electronics portion housing electrically connected to the battery housing end cap and open on one end.

5. The environmental severity measurement tool of claim 4, wherein the electronics portion further comprises:
    a canted coil spring, disposed about an end of the electronics portion housing and electrically connecting the electronics portion housing to the external housing.

6. The environmental severity measurement tool of claim 4, wherein the electronics portion further comprises:
    an endcap configured to cover an open end of the electronics portion housing, the endcap forming an opening that allows connecting to the connector port through the endcap.

7. The environmental severity measurement tool of claim 1, further comprising:
    an orientation pin, disposed in an end of the external housing and extending parallel to a longitudinal axis of the external housing.

8. The environmental severity measurement tool of claim 1, further comprising:
    an endcap configured to seal the open end of the external housing.

9. The environmental severity measurement tool of claim 1, wherein the software stored in the non-transitory memory for causing the processor to calculate total acceleration and acceleration along two of the three axes comprises software for causing the processor to: initiate a state survey upon receiving an interval timer interrupt; snapshot a realtime clock data; snapshot a temperature data; calculate samples of acceleration data along the three axes; compute a total acceleration value from the sampled acceleration data; compute an acceleration value along two axes from the sampled acceleration data; and wait for a next interval timer interrupt.

10. The environmental severity measurement tool of claim 1, wherein the software that comprises instructions for causing the processor to calculate calculate total acceleration and acceleration along two of the three axes comprises software for causing the processor to:
    calculate a predetermined number of acceleration values along the three axes;
    average the predetermined number of acceleration values along each axis into a single averaged acceleration value; and
    store the averaged acceleration value for the three axes.

11. The environmental severity measurement tool of claim 1, wherein the software stored in the non-transitory memory further comprises software for downloading stored acceleration data from the environmental severity measurement tool via the connector port.

\* \* \* \* \*